United States Patent
Leonard (10) Patent No.: US 10,730,613 B2
(45) Date of Patent: Aug. 4, 2020

(54) REGULATION SYSTEM FOR CONTROLLING THE VIBRATORY BEHAVIOR AND/OR THE TWISTING STABILITY OF A DRIVETRAIN, A ROTORCRAFT FITTED WITH SUCH A REGULATION SYSTEM, AND AN ASSOCIATED REGULATION METHOD

(71) Applicant: AIRBUS HELICOPTERS, Marignane (FR)

(72) Inventor: Anthony Leonard, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 414 days.

(21) Appl. No.: 16/007,473

(22) Filed: Jun. 13, 2018

(65) Prior Publication Data

US 2018/0370620 A1     Dec. 27, 2018

(30) Foreign Application Priority Data

Jun. 13, 2017 (FR) ...................................... 17 70621

(51) Int. Cl.
*B64C 27/00* (2006.01)
*B64D 31/06* (2006.01)
(Continued)

(52) U.S. Cl.
CPC ............ *B64C 27/001* (2013.01); *B64D 31/06* (2013.01); *B64D 35/02* (2013.01); *F02C 9/00* (2013.01);
(Continued)

(58) Field of Classification Search
CPC ............ B64C 27/001; B64C 2027/002; B64C 2027/003; B64C 2027/004;
(Continued)

(56) References Cited

U.S. PATENT DOCUMENTS 3,241,077 A * 3/1966 Smyth ................ H03H 11/1291
327/5
4,453,378 A * 6/1984 Zagranski ............ G05D 1/0858
60/39.281

(Continued)

FOREIGN PATENT DOCUMENTS

EP     0092424 A3    4/1982
EP     0092424 A2    10/1983
(Continued)

OTHER PUBLICATIONS

French Search Report for FR 1770621, Completed by the French Patent Office, dated Jan. 22, 2018, All together 6 Pages.

*Primary Examiner* — Angelina Shudy
*Assistant Examiner* — Mohamed Abdo Algehaim
(74) *Attorney, Agent, or Firm* — Brooks Kushman P.C.

(57) ABSTRACT

A regulation system for controlling the vibratory behavior in twisting and/or the twisting stability of a drivetrain of a rotorcraft, the regulation system comprising two regulation loops that are interleaved one in the other, the two regulation loops being arranged "in cascade" relative to each other to regulate firstly a first speed of rotation NG of a gas generator of at least one turboshaft engine driving said drivetrain in rotation, and secondly a second speed of rotation NTL of a free turbine of the engine(s).

13 Claims, 3 Drawing Sheets

(51) Int. Cl.
*F02C 9/28* (2006.01)
*B64D 35/02* (2006.01)
*F02C 9/56* (2006.01)
*F02C 9/00* (2006.01)

(52) U.S. Cl.
CPC .............. *F02C 9/28* (2013.01); *F02C 9/56* (2013.01); *F05D 2220/329* (2013.01); *F05D 2260/96* (2013.01); *F05D 2270/304* (2013.01); *F05D 2270/334* (2013.01); *F05D 2270/807* (2013.01)

(58) Field of Classification Search
CPC .. B64C 2027/005; B64D 35/02; B64D 31/06; B64D 31/02; B64D 35/00; F02C 9/00; F02C 9/56; F02C 9/28; F02C 9/48; F02C 9/58; F02C 9/46; F02C 3/10; F05D 2270/304; F05D 2270/334; F05D 2270/807; F05D 2220/329; F05D 2260/96; F05D 2220/32; F05D 2220/30
USPC ........................ 701/3–18, 100–115
See application file for complete search history.

(56) References Cited

U.S. PATENT DOCUMENTS

| | | | | |
|---|---|---|---|---|
| 4,478,038 | A * | 10/1984 | Cropper | F02C 9/28 434/54 |
| 4,519,743 | A * | 5/1985 | Ham | B64C 27/72 244/17.13 |
| 5,020,316 | A * | 6/1991 | Sweet | G05D 1/0858 416/30 |
| 5,189,620 | A * | 2/1993 | Parsons | G05B 7/02 318/609 |
| 5,303,142 | A * | 4/1994 | Parsons | G05B 7/02 700/40 |
| 6,921,248 | B2 * | 7/2005 | Almeras | B64C 27/14 416/35 |
| 7,438,259 | B1 * | 10/2008 | Piasecki | B64C 27/26 244/6 |
| 8,606,434 | B2 * | 12/2013 | Brenner | B64D 1/22 701/3 |
| 8,639,458 | B2 * | 1/2014 | Bechhoefer | B64C 27/008 244/17.11 |
| 8,829,701 | B2 * | 9/2014 | Ficklscherer | F02C 9/00 290/52 |
| 9,759,132 | B2 * | 9/2017 | Khalid | B64C 11/305 |
| 2003/0048203 | A1 * | 3/2003 | Clary | G01C 23/00 340/945 |
| 2003/0094001 | A1 * | 5/2003 | Desai | B64C 27/001 60/791 |
| 2004/0123600 | A1 * | 7/2004 | Brunell | F02C 9/00 60/773 |
| 2008/0297077 | A1 * | 12/2008 | Kovudhikulrungsri | H02P 21/22 318/400.02 |
| 2012/0188037 | A1 * | 7/2012 | Fullerton | H01F 7/0236 335/296 |
| 2013/0326383 | A1 * | 12/2013 | Gatti | G01H 1/003 715/771 |
| 2013/0327053 | A1 * | 12/2013 | Mitchell | F01D 19/00 60/773 |
| 2014/0145028 | A1 * | 5/2014 | Gomez | B64C 27/12 244/58 |
| 2014/0327489 | A1 * | 11/2014 | Tang | H03H 7/0153 333/17.1 |
| 2017/0159577 | A1 * | 6/2017 | Hino | H02J 3/46 |
| 2018/0257765 | A1 * | 9/2018 | Derham | B64C 27/001 |

FOREIGN PATENT DOCUMENTS

| | | |
|---|---|---|
| EP | 0398839 A2 | 11/1990 |
| EP | 0398839 A3 | 11/1990 |
| EP | 2719881 A2 | 4/2014 |
| EP | 2719881 A3 | 4/2017 |
| FR | 2843812 A1 | 2/2004 |

* cited by examiner

REGULATION SYSTEM FOR CONTROLLING THE VIBRATORY BEHAVIOR AND/OR THE TWISTING STABILITY OF A DRIVETRAIN, A ROTORCRAFT FITTED WITH SUCH A REGULATION SYSTEM, AND AN ASSOCIATED REGULATION METHOD

CROSS-REFERENCE TO RELATED APPLICATIONS

This application claims priority to French patent application No. FR 1770621 filed on Jun. 13, 2017, the disclosure of which is incorporated in its entirety by reference herein.

BACKGROUND OF THE INVENTION

(1) Field of the Invention

The present invention relates to the field of aircraft, and more particularly to the field of rotorcraft and their drivetrains, comprising in particular a main power transmission gearbox (MGB), associated power transmission shafts, and at least one main rotor providing the rotorcraft at least with lift and possibly with propulsion.

2) Description of Related Art

Such a drivetrain is thus driven in rotation by at least one engine such as a turboshaft engine comprising firstly a gas generator operating at a speed of rotation NG, and secondly a free turbine operating at a speed of rotation NTL for the purpose of driving a drivetrain of the rotorcraft in rotation.

The assembly made up of the turboshaft engine(s) together with the drivetrain then constitutes the power transmission of the rotorcraft.

The invention relates more particularly to regulation systems for guaranteeing satisfactory vibratory behavior in twisting and/or twisting stability for such a drivetrain, and also to corresponding regulation methods. Such systems then comprise at least one fuel metering member for feeding the turboshaft engine(s) with fuel, with the speed of rotation NG and the speed of rotation NTL being functions of the quantity of fuel injected into the turboshaft engine(s). Consequently, such regulation systems also include measurement means so as to measure the speed of rotation NG of the gas generator and the speed of rotation NTL of the free turbine of the (or each) engine.

In general manner, it is known that under certain flight conditions of a rotorcraft, resonant modes in twisting of its drivetrain can become coupled with resonant modes of a fuselage of the rotorcraft, and can then lead to phenomena of a different kind such as vibratory behavior of the forced vibratory resonant phenomena type in the drivetrain while it is subjected to imposed excitation, or indeed to instability phenomena characterizing the free response of the drivetrain when remote from its equilibrium position as a result of a vibratory disturbance. These phenomena can then damage the drivetrain and the associated structures in fatigue by creating large amounts of deformation, and the instabilities can lead to those elements being destroyed suddenly as a result of divergence of the oscillations.

The Applicant has described this problem in particular in document FR 2 843 812 and has provided a solution for controlling the twisting stability of the drivetrain of a rotorcraft without attenuating regulation gain. Such regulation is performed by adjusting the phase of the transfer function of an NTL filter placed in a regulation loop, the NTL filter serving to filter the measurement of the speed of rotation NTL obtained from the measurement means. That regulation then makes it possible to ensure acceptable vibratory behavior in twisting and/or the twisting stability of a drivetrain at a predetermined speed of rotation NR of the main rotor of the rotorcraft.

Nevertheless, such a regulation system does not make it possible to control the vibratory behavior in twisting and the twisting stability of the drivetrain for rotorcraft in which the speed of rotation NR of the main rotor can vary considerably, for example in order to respond to constraints concerning the acoustic footprint of the rotorcraft or in order to limit blade tip speed at high speeds of advance of a rotorcraft. Specifically such variation in the speed of rotation NR generates large amounts of variation in the resonant frequency of the first mode in twisting of the drivetrain, which cannot be filtered solely by acting on the phase of the transfer function of the NTL filter.

The regulation system and the regulation method as described in document FR 2 843 812 are therefore not suitable for rotorcraft of the latest generation in which the relationship for controlling the speed of rotation NR may vary over 5% to 10% of a nominal speed of rotation NR1 for example, and potentially even more, depending on how technology progresses, and more particularly over values potentially lying in a range of 90% to 115% of the nominal speed of rotation NR1.

Likewise, documents EP 0 092 424, EP 2 719 881, EP 0 398 839, U.S. Pat. Nos. 5,189,620, 4,519,743, and 3,241,077 describe other regulation systems for controlling the vibratory behavior in twisting of a rotorcraft drivetrain.

In addition, document EP 0 092 424 discloses a regulation system having two regulation loops that are interleaved one within the other and having two correctors, two comparators, and a conventional filter of differentiator type. That filter is written "d/dt" at the input of a damper circuit, which also has a corrector of adaptive type that is represented by the boxes K, 1/τ, and ∫ dt.

Thus, document EP 0 092 424 does not disclose a regulation system having a filter of adaptive type presenting filter coefficients that are suitable for being modified. Consequently, the regulation system also does not include computation means enabling the filter coefficients of its "d/dt" filter to be modified.

Under such circumstances, the "d/dt" filter serves solely to calculate the first derivative on the basis of the measured speed of rotation (NF) of the free turbine. Such a filter is then of the "highpass" type and serves to pass frequencies above a cutoff frequency of the filter and to attenuate frequencies below that cutoff frequency of the filter.

Nevertheless, document EP 0 092 424 does not under any circumstances make it possible to modify adaptively the filter coefficients, in particular in order to cause the cutoff frequency of the filter to vary.

Only the gain K and the time constant τ of the corrector can be modified adaptively.

BRIEF SUMMARY OF THE INVENTION

An object of the present invention is thus to propose a regulation system and a regulation method enabling the above-mentioned limitations to be overcome. Specifically, the regulation system serves to control the vibratory behavior in twisting and/or the twisting stability of a rotorcraft drivetrain over the entire range of variation for the speed of rotation NR of a rotorcraft main rotor.

The present invention thus relates to a regulation system for controlling the vibratory behavior in twisting and/or the twisting stability of a drivetrain of a rotorcraft, the regulation system comprising two regulation loops and that are interleaved one in the other, the two regulation loops being arranged "in cascade" relative to each other to regulate firstly a first speed of rotation NG of a gas generator of at least one turboshaft engine driving the drivetrain in rotation, and secondly a second speed of rotation NTL of a free turbine of the engine(s), the regulation system comprising at least:

a fuel metering member controlled by a control device, the control device responding to a fuel flow rate setpoint to generate a metering command for the fuel that is to be injected into the engine(s);

first measurement means for measuring a first speed of rotation of the gas generator of the engine(s);

a first comparator for generating a first difference of a first regulation loop, the first difference being generated by comparing a first setpoint for the first speed of rotation with the first measured speed of rotation;

a first corrector for correcting the first difference and for generating the fuel flow rate setpoint;

second measurement means for measuring the second speed of rotation NTL of the free turbine of the engine(s);

a filter for filtering the second measured speed of rotation and for generating a filtered signal;

a second comparator for generating a second difference of a second regulation loop, the second difference being generated by comparing a second setpoint for the second speed of rotation with the filtered signal; and a second corrector for correcting the second difference and for generating the first setpoint for the first speed of rotation.

According to the invention, such a regulation system is remarkable in that the filter is of adaptive type, the regulation system including computation means for determining filter coefficients of the filter, the filter coefficients being variable and associated with the filter in recursive manner by the computation means for controlling the vibratory behavior in twisting and/or the twisting stability of the drivetrain of the rotorcraft.

In addition, compared with conventional filtering, adaptive type filtering involves recursively updating the coefficients of the filter. Thus, by way of example, an algorithm may start from predetermined initial conditions and recursively modify the filter coefficients in order to adapt to the process. Since the speed of rotation NR of the rotor is not steady, the algorithm then has the ability to track variations in the statistical magnitudes of the process providing they vary slowly enough.

Advantageously, the filter may be of the band-stop type in order to stop a frequency band including a frequency of a first resonant mode in twisting of the drivetrain.

In other words, the filter makes it possible to eliminate noisy data in the frequency band that corresponds to the frequency of the first resonant mode in twisting of the drivetrain. Such a band-stop filter is made of a highpass filter and a lowpass filter having distinct cutoff frequencies, with the cutoff frequency of the lowpass filter being lower than the cutoff frequency of the highpass filter.

In practice, the filter may be a second order filter, the filter being defined by a transfer function of the following form:

$$\frac{NTLfiltered}{NTLmeasured} = \frac{\left(1 + \frac{2 \times Z1p}{W1p} \times p + \frac{1}{W1p^2} \times p^2\right)}{\left(1 + \frac{2 \times Z2p}{W2p} \times p + \frac{1}{W2p^2} \times p^2\right)}$$

where $NTL_{measured}$ is the second speed of rotation measured by the second measurement means, $NTL_{filtered}$ is the filtered signal generated from the second speed of rotation $NTL_{measured}$, and W1p, W2p, Z1p, and Z2p correspond to the filter coefficients.

Such a second order filter is specifically suitable for guaranteeing twisting stability of the drivetrain by conserving a gain margin of −6 decibels (dB) for the various flight situations of a rotorcraft having at least one turboshaft engine in operation and a phase margin lying in the range 30° to 60°. Such a filter is also a good compromise that makes it possible to optimize the reactivity of the regulation system over the entire range of variation for the speed of rotation NR of the main rotor.

Furthermore, in order to change the filter coefficients by means of the computation means, several distinct solutions can be envisaged.

In a first embodiment of the invention, the regulation system may include a first memory for storing at least two distinct sets of predetermined values for the filter coefficients W1p, W2p, Z1p, and Z2p, the computation means determining a first set for application to the filter when the second measured speed of rotation lies in a first range [a,b[, a second set for applying to the filter when the second measured speed of rotation lies in a second range [b,c[, and an $n^{th}$ set for applying to the filter when the second measured speed of rotation lies in an $n^{th}$ range [x1,x].

Under such circumstances, the computation means are then connected to the first memory and can act recursively to perform comparison operations between the measurement of the second measured speed of rotation $NTL_{measured}$ as taken by the second measurement means and the bounds a, b, c, . . . , x1, x of the various ranges [a,b[, [b,c[, . . . , [x1,x].

As a function of the results of these comparison operations, the computation means then give the filter one of the predetermined sets of values for the filter coefficients W1p, W2p, Z1p, and Z2p. The various sets may be determined before utilization of the rotorcraft by simulation on the ground, or by testing in flight on a test rotorcraft, or indeed on a fleet of rotorcraft fitted with such a regulation system.

In a second embodiment of the invention, the system may include an accelerometer for measuring vibration to which the rotorcraft is subjected, a measurement member for measuring the frequency of rotation of a main rotor of the rotorcraft, and a second memory for storing at least one threshold value for a vibration amplitude, the computation means acting, when the measured amplitude of the vibration is greater than the threshold value(s) for a predetermined duration, in order to modify the filter coefficients so that the frequency band stopped by the filter includes the frequency of rotation of the main rotor.

In this second embodiment, the filter coefficients of the filter are variable and they are adjusted in real time by the computation means so as to contain the amplitude of the vibration constantly below the threshold value(s). Such filter coefficients can thus be determined by an adaptive algorithm, such as for example a recursive least squares algorithm.

In addition and by way of example, such an amplitude of vibration to which the rotorcraft is subjected may relate to a speed expressed in millimeters per second (mm/s) and/or to an acceleration expressed in millimeters per second squared (mm/s$^2$). Furthermore and by way of example, the accelerometer may be of unidirectional or multidirectional type in order to measure the amplitude of the vibration in one or more predetermined directions.

The threshold value(s) may in particular be predetermined by calculation, by simulations performed on the ground, or indeed from data obtained from a fleet of rotorcraft.

Advantageously, the second corrector may implement a transfer function including fixed gains regardless of the value of the second measured speed of rotation NTL.

In this way, the reactivity of the regulation system is not modified while the second measured speed of rotation NTL$_{measured}$ varies. Consequently, it is possible to adjust the second corrector in optimum manner for the entire range of variation in the second speed of rotation NTL.

The invention also provides a rotorcraft fitted with a regulation system for controlling the vibratory behavior in twisting and/or the twisting stability of a drivetrain of such a rotorcraft, the regulation system having two regulation loops and interleaved one in the other, the two regulation loops being arranged "in cascade" relative to each other, in order to regulate firstly a first speed of rotation NG of a gas generator of at least one turboshaft engine driving the drivetrain in rotation, and secondly a second speed of rotation NTL of a free turbine of the engine(s).

According to the invention, the regulation system is as described above.

The present invention also provides a regulation method for controlling the vibratory behavior in twisting and/or the twisting stability of a drivetrain of a rotorcraft, the regulation method implementing two regulation loops that are interleaved one in the other, the two regulation loops being arranged "in cascade" relative to each other to regulate firstly a first speed of rotation NG of a gas generator of at least one turboshaft engine driving the drivetrain in rotation, and secondly a second speed of rotation NTL of a free turbine of the engine(s), the regulation method comprising at least:

a fuel metering step controlled by a control device, the control device responding to a fuel flow rate setpoint to generate a metering command for the fuel that is to be injected into the at least one engine;

a first measurement step for measuring a first speed of rotation NG$_{measured}$ of the gas generator of the engine(s);

a first comparison step for generating a first difference of a first regulation loop, the first difference being generated by comparing a first setpoint for the first speed of rotation with the first measured speed of rotation NG$_{measured}$;

a first correction step for correcting the first difference and for generating the fuel flow rate setpoint;

a second measurement step for measuring a second speed of rotation NTL$_{measured}$ of the free turbine of the engine(s);

a filtering step for filtering the second measured speed of rotation NTL$_{measured}$ and for generating a filtered signal;

a second comparison step for generating a second difference of a second regulation loop, the second difference being generated by comparing a second setpoint for the second speed of rotation with the filtered signal; and a second correction step for correcting the second difference and for generating the first setpoint for the first speed of rotation.

According to the invention, such a regulation method is remarkable in that the filtering step is performed by a filter of adaptive type, the regulation method including at least one calculation step for determining filter coefficients of the filter, the filter coefficients being variable and being associated with the filter in recursive manner during the calculation step(s) to control the vibratory behavior in twisting and/or the twisting stability of the drivetrain of the rotorcraft.

In other words, the calculation step of the regulation method acts in real time to modify the filter coefficients during a mission of a rotorcraft. In this way, the regulation method makes it possible to ensure twisting stability of the drivetrain of the rotorcraft regardless of the speed of rotation of the main rotor.

Advantageously, the filtering step may stop a frequency band including the frequency of a first resonant mode in twisting of said drivetrain.

Such a filtering step thus serves to eliminate interference in a frequency band that can vary with the frequency of the first resonant mode in twisting of the drivetrain as a function of the speed of rotation of the main rotor of the rotorcraft.

In practice, the filtering step may be performed by a second order filter, the filter being defined by a transfer function of the following form:

$$\frac{NTLfiltered}{NTLmeasured} = \frac{\left(1 + \frac{2 \times Z1p}{W1p} \times p + \frac{1}{W1p^2} \times p^2\right)}{\left(1 + \frac{2 \times Z2p}{W2p} \times p + \frac{1}{W2p^2} \times p^2\right)}$$

where NTL$_{measured}$ is the second speed of rotation measured by the second measurement means, NTL$_{filtered}$ is the filtered signal generated by the filter from the second speed of rotation NTL$_{measured}$, and W1p, W2p, Z1p, and Z2p correspond to the filter coefficients.

Specifically, it has been found that a second order filter is advantageous for guaranteeing good reactivity for the regulation system while still enabling −6 dB of attenuation on the resonant peaks in twisting corresponding to the resonant modes in twisting.

In a first variant of the invention, the regulation method may include a first storage step for storing at least two distinct sets W1p, W2p, Z1p, and Z2p of predetermined values for the filter coefficients, the calculation step(s) determining a first set for application to the filter when the second measured speed of rotation NTL$_{measured}$ lies in a first range [a,b[, a second set for applying to the filter when the second measured speed of rotation NTL$_{measured}$ lies in a second range [b,c[, and an n$^{th}$ set for applying to the filter when the second measured speed of rotation NTL$_{measured}$ lies in an n$^{th}$ range [x1,x].

In other words, in the first variant of the regulation method, the calculation step(s) serve(s) to compare the second measured speed of rotation NTL$_{measured}$ with the bounds a, b, c, . . . , x1, x of the various ranges. As a function of the results of this comparison, the calculation step allocates to the filter one of the sets selected from the sets of predetermined values of filter coefficients W1p, W2p, Z1p, and Z2p.

In a second variant of the invention, the regulation method includes a third measurement step for measuring vibration to which the rotorcraft is subjected, a fourth measurement step for measuring the frequency of rotation of a main rotor of the rotorcraft, and a second storage step for storing at least one threshold value for a vibration amplitude, the calculation step(s) acting, when the measured amplitude of the vibration is greater than the threshold value for a predetermined duration, in order to modify the filter coefficients so that the frequency band stopped by the filter includes the frequency of rotation of the main rotor.

In this second variant of the regulation method, the calculation step serves to calculate the filter coefficients of the filter and to modify them in real time so as to keep the amplitude of the vibration constantly below the threshold value(s). Such filter coefficients can thus be determined by an adaptive algorithm, such as for example a recursive least squares algorithm.

BRIEF DESCRIPTION OF THE DRAWINGS

The invention and its advantages appear in greater detail from the context of the following description of examples given by way of illustration and with reference to the accompanying figures, in which.

DETAILED DESCRIPTION OF THE INVENTION

Elements present in several distinct figures may be given the same references in each of them.

As mentioned above, the invention thus relates to a regulation system for controlling the stability in twisting of a drivetrain of a rotorcraft.

Figure 1:
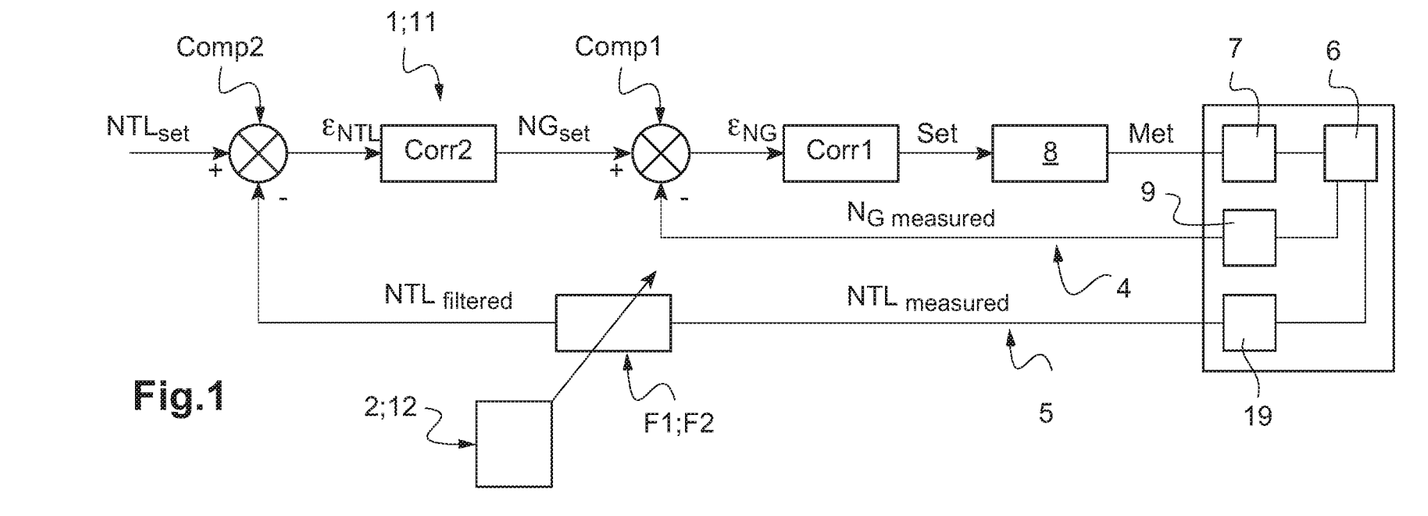
FIG. 1 is a block diagram showing a regulation system in accordance with the invention.

As shown in FIG. 1, such a regulation system 1, 11 has two regulation loops 4 and 5 interleaved one in the other, these two regulation loops 4 and 5 being arranged "in cascade" relative to each other, by using first measurement means 9 and second measurement means 19 respectively for measuring a first speed of rotation $NG_{measured}$ of a gas generator of a turboshaft engine 6 and a second speed of rotation $NTL_{measured}$ of a free turbine of the engine 6.

The regulation system 1, 11 also has a fuel metering member 7 for injecting fuel into the engine 6. Such a fuel metering member 7 is thus controlled by a control device 8 suitable for generating a metering command Met as a function of a fuel flow rate setpoint Set.

A first comparator Comp1 serves to compare a first setpoint $NG_{set}$ for the first speed of rotation with the first speed of rotation $NG_{measured}$ from the first measurement means 9. The first comparator Comp1 then generates a first difference $\varepsilon_{NG}$ specific to the first regulation loop 4 and a first corrector Corr1 uses this first difference $\varepsilon_{NG}$ to generate the fuel flow rate setpoint Set.

In the second regulation loop 5, a filter F1, F2 serves to filter the second speed of rotation $NTL_{measured}$ as transmitted by the second measurement means 19 and thus generates a filtered signal $NTL_{filtered}$. Such a filter F1, F2 may for example be a filter of the band-stop type, thus making it possible to eliminate a frequency band that includes a first resonant mode in twisting of the drivetrain of the rotorcraft.

A second comparator Comp2 then serves to compare a second setpoint $NTL_{set}$ for the second speed of rotation with the filtered signal $NTL_{filtered}$. On the basis of this comparison, the second comparator Comp2 thus generates a second difference $\varepsilon_{NTL}$ for the second regulation loop 5.

Finally, this second difference $\varepsilon_{NTL}$ is corrected by a second corrector Corr2 in order to generate the first setpoint $NG_{set}$.

The filter F1, F2 is remarkable in that it is of adaptive type, with the filter coefficients of the filter F1, F2 being variable over time so as to at least guarantee stability in twisting of the drivetrain of the rotorcraft in which the speed of rotation NR of the main rotor is variable, in particular in order to respond to constraints concerning sound level in the environment and/or in order to limit blade tip speed at high speeds of advance of the rotorcraft.

In addition, the regulation system 1, 11 has computation means 2, 12 acting recursively to determine the filter coefficients for applying to the filter F1, F2. Such computation means 2, 12 are thus suitable for acting in real time, e.g. while the rotorcraft is in flight, to modify the filter coefficients of the filter F1, F2.

In practice, the filter F1, F2 may be a second order filter, thus making it possible to obtain optimized performance by presenting a transfer function of the form:

$$\frac{NTLfiltered}{NTLmeasured} = \frac{\left(1 + \frac{2 \times Z1p}{W1p} \times p + \frac{1}{W1p^2} \times p^2\right)}{\left(1 + \frac{2 \times Z2p}{W2p} \times p + \frac{1}{W2p^2} \times p^2\right)}$$

where $NTL_{measured}$ is the second speed of rotation as measured by the second measurement means, $NTL_{filtered}$ is the filtered signal generated from the second speed of rotation $NTL_{measured}$, and W1p, W2p, Z1p, and Z2p correspond to the filter coefficients.

Furthermore, there are various ways of setting the computation means 2, 12 in order to determine the filter coefficients F1, F2.

Figure 2:
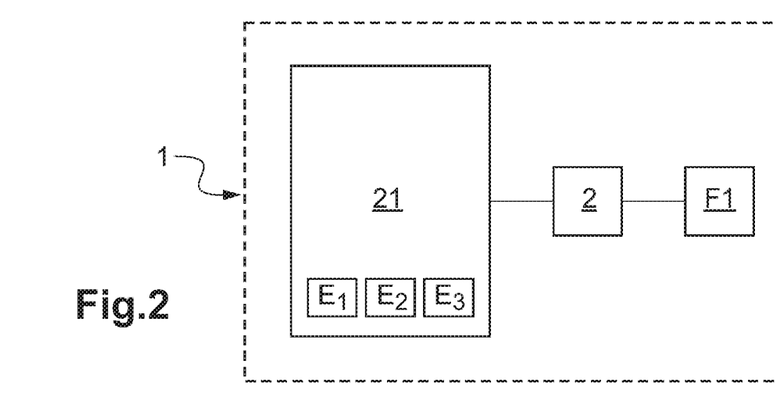
FIG. 2 is a block diagram showing a first example of a regulation system in accordance with the invention.

Thus, in a first embodiment of the regulation system 1 as shown in FIG. 2, the regulation system 1 may include a first memory 21. Under such circumstances, the computation means 2 may be connected to the first memory 21 for storing various sets E1, E2, ..., En of predetermined values for the filter coefficients W1p, W2p, Z1p, and Z2p.

The computation means 2 can then give the filter F1 a set of predetermined values for the filter coefficients as a function of the value of the second measured speed of rotation $NTL_{measured}$. For example, the computation means 2 may monitor the current value of the second measured speed of rotation $NTL_{measured}$ and select a first set E1 when the second measured speed of rotation $NTL_{measured}$ lies in a first range [a,b[, a second set E2 when the second measured speed of rotation $NTL_{measured}$ lies within a second range [b,c[, and an $n^{th}$ set En when the second measured speed of rotation $NTL_{measured}$ lies in an $n^{th}$ range [x1,x].

Figure 3:
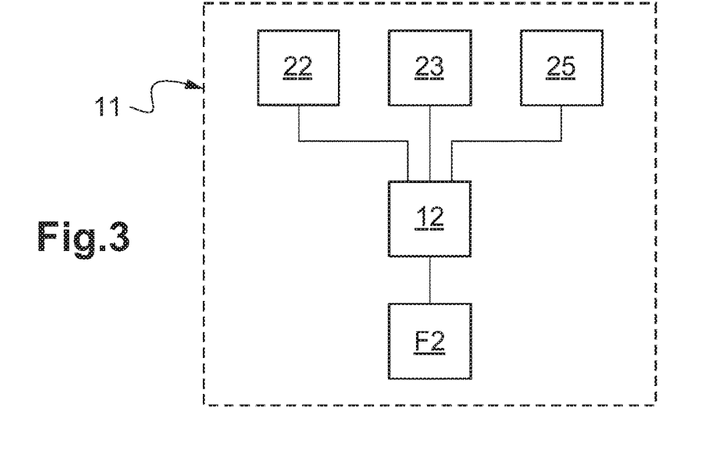
FIG. 3 is a block diagram showing a second example of a regulation system in accordance with the invention.

In a second embodiment of the regulation system 11 as shown in FIG. 3, the regulation system 11 may include an accelerometer 22 for measuring the vibration to which the rotorcraft is subjected. The regulation system 11 then also has a measurement member 23 for measuring the frequency of rotation $f_{rot}$ of a main rotor 24 of the rotorcraft 13, as shown in FIG. 4.

In addition, the regulation system 11 also has a second memory 25 for storing at least one threshold value for an amplitude of vibration to which the rotorcraft 13 is subjected.

The accelerometer 22, the measurement member 23, and the second memory 25 are then connected to the computation means 12 that act when the measured amplitude of the vibration is greater than the threshold value for a predetermined duration to modify the filter coefficients so that the frequency band stopped by the filter F2 includes the frequency of rotation $f_{rot}$ of the main rotor 24 of the rotorcraft 13.

Figure 4:
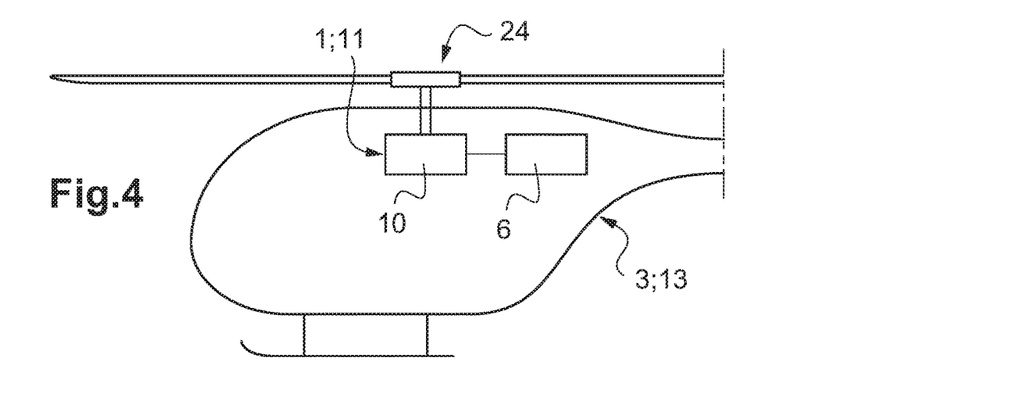
FIG. 4 is a side view of a helicopter fitted with a regulation system in accordance with the invention.

As shown in FIG. 4, the invention also relates to a rotorcraft 3, 13 having a regulation system 1, 11 as described above with reference to FIGS. 1 to 3. Such a regulation system 1, 11 thus makes it possible to control the vibratory behavior in twisting and/or the twisting stability of the drivetrain 10 of the rotorcraft 3, 13 at the outlet from the turboshaft engine 6. Such a drivetrain 10 generally comprises a main power transmission gearbox (MGB) and power transmission shafts serving to transmit rotary motion from the engine 6 to a main rotor 24.

Figure 5:
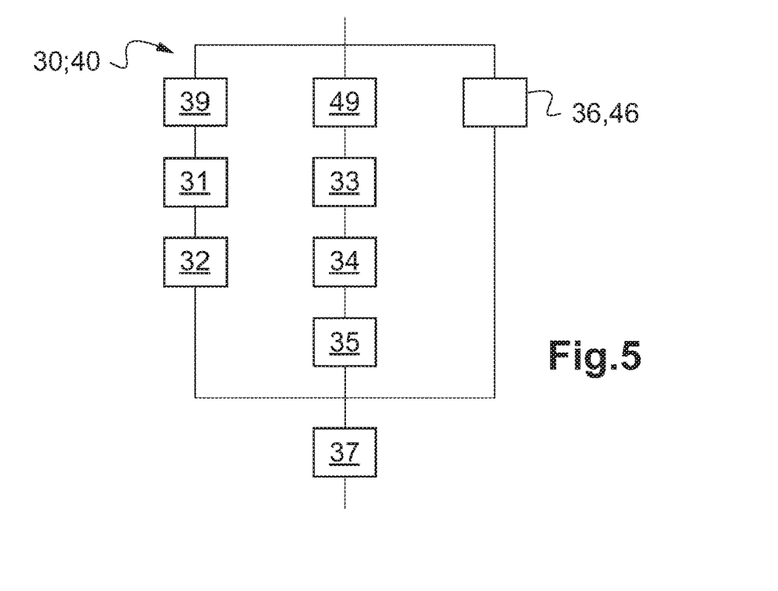
FIG. 5 is a flow chart showing a regulation method in accordance with the invention.
Figure 6:
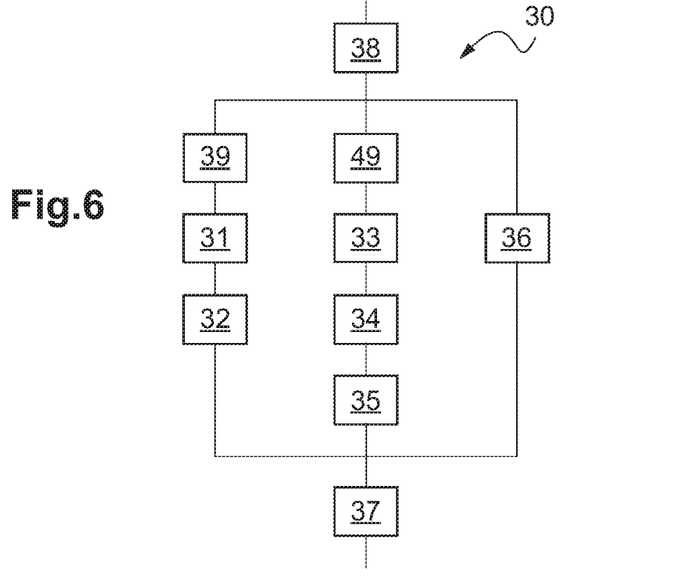
FIG. 6 is a flow chart showing a first variant of a regulation method in accordance with the invention.
Figure 7:
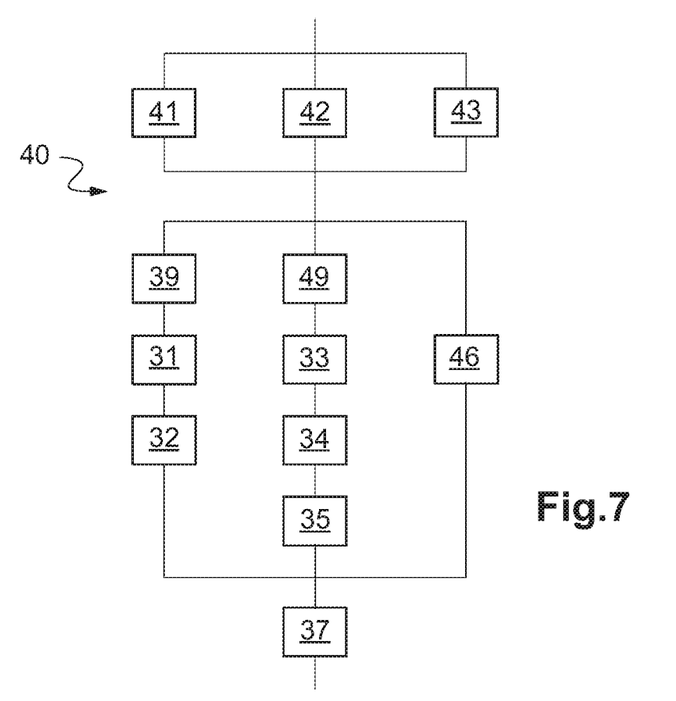
FIG. 7 is a flow chart showing a second variant of the regulation method in accordance with the invention.

As shown in FIGS. 5 to 7, the invention also relates to a regulation method 30, 40 for controlling the vibratory behavior in twisting and/or the twisting stability of the drivetrain 10 of the rotorcraft 3, 13.

As shown in FIG. 5, such a regulation method 30, 40 thus includes a step 37 of metering fuel under the control of the control device 8. Such a control device 8 acts on the basis of a fuel flow rate setpoint Set to generate a fuel metering command Met for metering the fuel that is to be injected into the engine(s) 6.

The regulation method 30, 40 also has a first measurement step 39 for measuring a first speed of rotation $NG_{measured}$ of a gas generator of the engine(s) 6 of the rotorcraft 3, 13.

The regulation method 30, 40 then performs a first comparison step 31 in order to generate a first difference $\varepsilon_{NG}$ of the first regulation loop 4. As mentioned above, the first difference $\varepsilon_{NG}$ is then generated by comparing a first setpoint $NG_{set}$ for the first speed of rotation with the first measured speed of rotation $NG_{measured}$.

The regulation method 30, 40 then includes a first correction step 32 for correcting the first difference $\varepsilon_{NG}$ and generating the fuel flow rate setpoint Set.

A second measurement step 49 serves to measure a second speed of rotation $NTL_{measured}$ of a free turbine of the engine(s) 6. Thereafter, a filtering step 33 filters the second measured speed of rotation $NTL_{measured}$ and generates a filtered signal $NTL_{filtered}$. Such a filtering step 33 is performed by a filter F1, F2 of adaptive type, which may be a second order filter of the band-stop type, for example.

The regulation method 30, 40 also has a second comparison step 34 for generating a second difference $\varepsilon_{NTL}$ of the second regulation loop 5. This second difference $\varepsilon_{NTL}$ is obtained by comparing a second setpoint $NTL_{set}$ for the second speed of rotation with the filtered signal $NTL_{filtered}$.

Furthermore, a second correction step 35 serves to correct the second difference $\varepsilon_{NTL}$ and to generate the first setpoint $NG_{set}$.

Such a regulation method 30, 40 finally includes at least one calculation step 36, 46 in order to determine the filter coefficients of the filter F1, F2. Specifically, these filter coefficients are variable and they are given to the filter F1, F2 in recursive manner during the calculation step 36, 46. The filter coefficients are then selected so as to act constantly to control the vibratory behavior in twisting and/or the twisting stability of the drivetrain 10 of the rotorcraft 3, 13.

Naturally, such a calculation step 36, 46 may be performed in various ways.

As shown in FIG. 6, in a first variant of the invention, the regulation method 30 may also include a first storage step 38 for storing at least two distinct sets E1, E2, . . . , En of predetermined values for the filter coefficients W1p, W2p, Z1p, and Z2p.

Under such circumstances, the calculation step 36 then serves to apply a first set E1 to the filter F1 when the second measured speed of rotation $NTL_{measured}$ lies in a first range [a,b[, a second set E2 to the filter F1 when the second measured speed of rotation $NTL_{measured}$ lies in a second range [b,c[, and an $n^{th}$ set En to the filter F1 when the second measured speed of rotation $NTL_{measured}$ lies in an $n^{th}$ range [x1,x].

In a second variant of the invention, as shown in FIG. 7, the regulation method 40 may alternatively include a third measurement step 41 for measuring the vibration to which the rotorcraft 13 is subjected, a fourth measurement step 42 serving to measure the frequency of rotation $f_{rot}$ of the main rotor 24 of the rotorcraft 13, and a second storage step 43 for storing at least one threshold value for a vibration amplitude.

In this second variant of the invention, the calculation step 46 serves, when the measured amplitude of the vibration is greater than the threshold value for a predetermined duration, to modify the filter coefficients so that the frequency band stopped by the filter F2 includes the frequency of rotation $f_{rot}$ of the main rotor 24.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the invention.

What is claimed is:

1. A regulation system for controlling vibratory behavior in twisting and/or twisting stability of a drivetrain of a rotorcraft, the regulation system comprising two regulation loops that are interleaved one another, the regulation loops being arranged in cascade relative to each other to regulate firstly a first speed of rotation NG of a gas generator of at least one turboshaft engine driving the drivetrain in rotation, and secondly a second speed of rotation NTL of a free turbine of the turboshaft engines(s), the regulation system comprising at least:
    a fuel metering member controlled by a control device, the control device responding to a fuel flow rate setpoint (Set) to generate a metering command (Met) for fuel that is to be injected into the turboshaft engine(s);
    first measurement means for measuring a first measured speed of rotation ($NG_{measured}$) of the gas generator of the turboshaft engine(s);
    a first comparator for generating a first difference ($\varepsilon_{NG}$) of a first regulation loop, the first difference ($\varepsilon_{NG}$) being generated by comparing a first setpoint ($NG_{set}$) for the first speed of rotation with the first measured speed of rotation ($NG_{measured}$)
    a first corrector for correcting the first difference ($\varepsilon_{NG}$) and for generating the fuel flow rate setpoint (Set);
    second measurement means for measuring a second measured speed of rotation ($NTL_{measured}$) of the free turbine of the engine(s);
    a filter for filtering the second measured speed of rotation ($NTL_{measured}$) and for generating a filtered signal ($NTL_{filtered}$);

a second comparator for generating a second difference ($\varepsilon_{NTL}$) of a second regulation loop, the second difference ($\varepsilon_{NTL}$) being generated by comparing a second setpoint ($NTL_{set}$) for the second speed of rotation with the filtered signal ($NTL_{filtered}$); and a second corrector for correcting the second difference ($\varepsilon_{NTL}$) and for generating the first setpoint ($NG_{set}$) for the first speed of rotation;

wherein the filter is of adaptive type, the regulation system including computation means for determining filter coefficients of the filter, the filter coefficients being variable and associated with the filter in recursive manner by the computation means for controlling the vibratory behavior in twisting and/or the twisting stability of the drivetrain of the rotorcraft, wherein the filter is a band-stop type filter in order to stop a frequency band including a frequency of a first resonant mode in twisting of the drivetrain, and wherein the filter is a second order filter, the filter being defined by a transfer function of the following form:

$$\frac{NTLfiltered}{NTLmeasured} = \frac{\left(1 + \frac{2 \times Z1p}{W1p} \times p + \frac{1}{W1p^2} \times p^2\right)}{\left(1 + \frac{2 \times Z2p}{W2p} \times p + \frac{1}{W2p^2} \times p^2\right)}$$

where $NTL_{measured}$ is the second speed of rotation measured by the second measurement means, $NTL_{filtered}$ is the filtered signal generated by the filter from the second speed of rotation $NTL_{measured}$, W1p, W2p, Z1p, and Z2p correspond to the filter coefficients.

2. The system according to claim 1, wherein the regulation system includes a first memory for storing at least two distinct sets of predetermined values for the filter coefficients (W1p, W2p, Z1p, Z2p), the computation means determining a first set (E1) for application to the filter when the second measured speed of rotation ($NTL_{measured}$) lies in a first range [a,b[, a second set (E2) for applying to the filter when the second measured speed of rotation ($NTL_{measured}$) lies in a second range [b,c[, and an $n^{th}$ set (En) for applying to the filter when the second measured speed of rotation ($NTL_{measured}$) lies in an $n^{th}$ range [x1,x].

3. The system according to claim 1, wherein the system includes an accelerometer for measuring vibration to which the rotorcraft is subjected, a measurement member for measuring frequency of rotation ($f_{rot}$) of a main rotor of the rotorcraft, and a second memory for storing at least one threshold value for a vibration amplitude, the computation means acting, when the measured amplitude of the vibration is greater than the threshold value(s) for a predetermined duration, in order to modify the filter coefficients so that the frequency band stopped by the filter (F2) includes the frequency of rotation ($f_{rot}$) of the main rotor.

4. The system according to claim 1, wherein the second corrector implements a transfer function including fixed gains regardless of the value of the second measured speed of rotation ($NTL_{measured}$).

5. A rotorcraft fitted with a regulation system for controlling vibratory behavior in twisting and/or twisting stability of a drivetrain of the rotorcraft, the regulation system having two regulation loops interleaved one another, the two regulation loops being arranged in cascade relative to each other, in order to regulate firstly a first speed of rotation NG of a gas generator of at least one turboshaft engine driving the drivetrain in rotation, and secondly a second speed of rotation NTL of a free turbine of the turboshaft engine(s), wherein the regulation system is according to claim 1.

6. A regulation method for controlling vibratory behavior in twisting and/or twisting stability of a drivetrain of a rotorcraft, the regulation method implementing two regulation loops that are interleaved one another, the regulation loops being arranged in cascade relative to each other to regulate firstly a first speed of rotation NG of a gas generator of at least one turboshaft engine driving the drivetrain in rotation, and secondly a second speed of rotation NTL of a free turbine of the turboshaft engine(s), the regulation method comprising at least:

a fuel metering member controlled by a control device, the control device, responding to a fuel flow rate setpoint (Set) to generate a metering command (Met) for fuel that is to be injected into the turboshaft engine(s);

a first measurement means for measuring, a first measured speed of rotation ($NG_{measured}$) of the gas generator of the engine(s);

a first comparison step for generating a first difference ($\varepsilon_{NG}$) of a first regulation loop, the first difference ($\varepsilon_{NG}$) being generated by comparing a first setpoint ($NG_{set}$) for the first speed of rotation with the first measured speed of rotation ($NG_{measured}$)

a first correction step for correcting the first difference ($\varepsilon_{NG}$) and for generating the fuel flow rate setpoint (Set);

a second measurement means for measuring a second measured speed of rotation ($NTL_{measured}$) of the free turbine of the turboshaft engine(s);

a filtering step for filtering the second measured speed of rotation ($NTL_{measured}$) and for generating a filtered signal ($NTL_{filtered}$);

a second comparison step for generating a second difference ($\varepsilon_{NTL}$) of a second regulation loop, the second difference ($\varepsilon_{NTL}$) being generated by comparing a second setpoint ($NTL_{set}$) for the second speed of rotation with the filtered signal ($NTL_{filtered}$); and a second correction step for correcting the second difference ($\varepsilon_{NTL}$) and for generating the first setpoint ($NG_{set}$) for the first speed of rotation;

wherein the filtering step is performed by a filter of adaptive type, the regulation method including at least one calculation step for determining filter coefficients of the filter, the filter coefficients being variable and associated with the filter in recursive manner during the calculation step(s) to control the vibratory behavior in twisting and/or the twisting stability of the drivetrain of the rotorcraft, wherein the filtering step stops a frequency hand including the frequency of a first resonant mode in twisting of the drivetrain, and wherein the filtering step is performed by a second order filter, the filter being defined by a transfer function of the following form:

$$\frac{NTLfiltered}{NTLmeasured} = \frac{\left(1 + \frac{2 \times Z1p}{W1p} \times p + \frac{1}{W1p^2} \times p^2\right)}{\left(1 + \frac{2 \times Z2p}{W2p} \times p + \frac{1}{W2p^2} \times p^2\right)}$$

where $NTL_{measured}$ is the second speed of rotation measured by the second measurement means, $NTL_{filtered}$ is the filtered signal generated by the filter from the second speed of rotation $NTL_{measured}$, and W1p, W2p, Z1p, and Z2p correspond to the filter coefficients.

7. The method according to claim 6, wherein the regulation method includes a first storage step for storing at least two distinct sets of predetermined values for the filter coefficients (W1p, W2p, Z1p, Z2p), the calculation step(s) determining a first set (E1) for application to the filter when the second measured speed of rotation ($NTL_{measured}$) lies in a first range [a,b[, a second set (E2) for applying to the filter when the second measured speed of rotation ($NTL_{measured}$) lies in a second range [b,c[, and an $n^{th}$ set (En) for applying to the filter when the second measured speed of rotation ($NTL_{measured}$) lies in an $n^{th}$ range [x1, x].

8. The method according to claim 6, wherein the regulation method includes a third measurement step for measuring vibration to which the rotorcraft is subjected, a fourth measurement step for measuring frequency of rotation ($f_{rot}$) of a main rotor of the rotorcraft, and a second storage step for storing at least one threshold value for a vibration amplitude, the calculation step(s) acting, when the measured amplitude of the vibration is greater than the threshold value (s) for a predetermined duration, in order to modify the filter coefficients so that the frequency band stopped by the filter includes the frequency of rotation ($f_{rot}$) of the main rotor.

9. A regulation system for controlling vibratory behavior in twisting and/or twisting stability of a drivetrain of a rotorcraft, the regulation system comprising two regulation loops in cascade relative to each other to regulate firstly a first speed of rotation NO of a gas generator of an engine driving the drivetrain in rotation, and a second speed of rotation NTL of a free turbine of the engine, the regulation system comprising:
a fuel metering device controllable by a control device, the control device respondable to a fuel flow rate setpoint (Set) to generate a metering command (Met) for fuel to be injected into the engine;
a first measurement device for measuring a first measured speed of rotation ($NG_{measured}$) of the gas generator of the engine;
a first comparator device for generating a first difference ($\varepsilon_{NG}$) of a first regulation loop, the first difference ($\varepsilon_{NG}$) being generated by comparing a first setpoint ($NG_{set}$) for the first speed of rotation with the first measured speed of rotation ($NG_{measured}$)
a first correction device for correcting the first difference ($\varepsilon_{NG}$) and for generating, the fuel flow rate setpoint (Set);
a second measurement device for measuring a second measured speed of rotation ($NTL_{measured}$) of the free turbine of the engine;
a filter for filtering the second measured speed of rotation ($NTL_{measured}$) and for generating a filtered signal ($NTL_{filtered}$);
a second comparator device for generating a second difference ($\varepsilon_{NTL}$) of a second regulation loop, the second difference ($\varepsilon_{NTL}$) being generated by comparing a second setpoint ($NTL_{set}$) for the second speed of rotation with the filtered signal ($NTL_{filtered}$); and
a second correction device for correcting the second difference ($\varepsilon_{NTL}$) and for generating the first setpoint ($NG_{set}$) for the first speed of rotation;
wherein the filter is an adaptive type, the regulation system including a computation device means for determining filter coefficients of the filter, the filter coefficients being variable and associated with the filter in recursive manner by the computation device for controlling the vibratory behavior in twisting and/or the twisting stability of the drivetrain of the rotorcraft,
wherein the filter is a band-stop type filter in order to stop a frequency band including a frequency of a first resonant mode in twisting of the drivetrain, and
wherein the filter is a second order filter, the filter being defined by a transfer function of the following form:

$$\frac{NTLfiltered}{NTLmeasured} = \frac{\left(1 + \frac{2 \times Z1p}{W1p} \times p + \frac{1}{W1p^2} \times p^2\right)}{\left(1 + \frac{2 \times Z2p}{W2p} \times p + \frac{1}{W2p^2} \times p^2\right)}$$

Where $NTL_{measured}$ is the second speed of rotation measured by the second measurement means, $NTL_{filtered}$ is the filtered signal generated by the filter from the second speed of rotation $NTL_{measured}$, and W1p, W2p, Z1p, and Z2p correspond to the filter coefficients.

10. The system according to claim 9, wherein the regulation system includes a first memory for storing at least two distinct sets of predetermined values for the filter coefficients (W1p, W2p, Z1p, Z2p), the computation device determining a first set (E1) for application to the filter when the second measured speed of rotation ($NTL_{measured}$) lies in a first range [a,b[, a second set (E2) for applying to the filter when the second measured speed of rotation ($NTL_{measured}$) lies in a second range [b, c[, and an $n^{th}$ set (En) for applying to the filter when the second measured speed of rotation ($NTL_{measured}$) lies in an n'h range [x1,x].

11. The system according to claim 9, wherein the system includes an accelerometer for measuring vibration to which the rotorcraft is subjected, a measurement device for measuring frequency of rotation ($f_{rot}$) of a main rotor of the rotorcraft, and a second memory for storing a threshold value for a vibration amplitude, the computation device acting, when the measured amplitude of the vibration is greater than the threshold value for a predetermined duration, in order to modify the filter coefficients so that the frequency band stopped by the filter includes the frequency of rotation ($f_{rot}$) of the main rotor.

12. The system according to claim 9, wherein the second correction device implements a transfer function including fixed gains regardless of the value of the second measured speed of rotation ($NTL_{measured}$).

13. A rotorcraft fitted with the regulation system according to claim 9.

* * * * *